US012444969B2

(12) United States Patent
Gonring

(10) Patent No.: US 12,444,969 B2
(45) Date of Patent: Oct. 14, 2025

(54) MARINE AC GENERATOR SYSTEM AND METHOD

(71) Applicant: Brunswick Corporation, Mettawa, IL (US)

(72) Inventor: Steven J. Gonring, Slinger, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 16/922,782

(22) Filed: Jul. 7, 2020

(65) Prior Publication Data

US 2022/0014036 A1    Jan. 13, 2022

(51) Int. Cl.
*H02J 7/14* (2006.01)
*B63H 21/20* (2006.01)
*H02J 4/00* (2006.01)
*H02K 7/18* (2006.01)
*H02K 11/00* (2016.01)

(52) U.S. Cl.
CPC ............ *H02J 7/1423* (2013.01); *B63H 21/20* (2013.01); *H02J 4/00* (2013.01); *H02J 7/1469* (2013.01); *H02K 7/1815* (2013.01); *H02K 11/0094* (2013.01); *B63H 2021/205* (2013.01)

(58) Field of Classification Search
CPC ................ H02J 7/1423; B63H 21/20
See application file for complete search history.

(56) References Cited

U.S. PATENT DOCUMENTS

| 6,032,753 | A | * | 3/2000 | Yamazaki | ............... B60L 15/20 903/905 |
| 6,273,771 | B1 | | 8/2001 | Buckley et al. | |
| 6,590,396 | B1 | * | 7/2003 | Zur | ..................... H02J 7/00306 324/433 |
| 8,118,627 | B2 | | 2/2012 | Wejrzanowski et al. | |
| 8,725,329 | B1 | * | 5/2014 | Snyder | .................. B63H 21/20 440/6 |
| 2006/0284604 | A1 | * | 12/2006 | Qi | ............................ H02P 9/14 322/7 |
| 2007/0052243 | A1 | * | 3/2007 | Shimoyama | .............. H02P 9/48 290/40 B |

(Continued)

FOREIGN PATENT DOCUMENTS

| JP | 2008228400 A | 9/2008 |
| WO | 2008113999 A1 | 9/2008 |

OTHER PUBLICATIONS https://integrelsolutions.com/, Integrel Solutions, Accessed Mar. 23, 2020.

(Continued)

*Primary Examiner* — Daniel Kessie
(74) *Attorney, Agent, or Firm* — Andrus Intellectual Property Law, LLP

(57) ABSTRACT

A marine AC generator system includes a marine generator driven by an internal combustion engine and configured to generate an AC current and a rectifier configured to rectify the AC current to provide a DC current. At least one battery is configured to receive and be charged by the DC current. A battery powered inverter is configured to be powered by the at least one battery and to generate a variable current output frequency such that an AC electrical power is provided to a load when the marine generator is not running.

16 Claims, 4 Drawing Sheets

(56) References Cited

U.S. PATENT DOCUMENTS

| | | | |
|---|---|---|---|
| 2010/0105259 A1* | 4/2010 | Wejrzanowski | B63H 21/17 |
| | | | 318/400.23 |
| 2019/0143831 A1* | 5/2019 | Birek | B60L 58/14 |
| | | | 701/22 |
| 2019/0241243 A1 | 8/2019 | Rembach | |

OTHER PUBLICATIONS

European search report dated Dec. 8, 2021 in counterpart European Patent Application 21183350.4.

* cited by examiner

| MODE | TURN ON | TURN OFF | ALLOWABLE ENGINE SPEED | COMMENTS |
|---|---|---|---|---|
| OFF | NA | NA | OFF | |
| LOW SPEED | <70%SOC | >75%SOC | 2000 | QUIETEST SETTING |
| MEDIUM SPEED | <80%SOC | >85%SOC | 2500 | NOMINAL SETTING |
| HIGH SPEED | <95%SOC | >100%SOC | 3500 | CHARGES BATTERY AS QUICKLY AS POSSIBLE |
| STATE OF CHARGE | LOAD EXCEEDS 30 AMPS OR <80%SOC | LOAD EXCEEDS 10 AMPS AND >90%SOC | VARIABLE | GENERATOR WILL BE ALLOWED TO RUN AT WHATEVER SPEED NECESSARY TO MATCH DEMAND +10% |
| AMBIENT NOISE | WHEN AMBIENT NOISE LEVEL IS ABOVE THRESHOLD | WHEN AMBIENT NOISE LEVEL IS BELOW THRESHOLD | VARIABLE | GENERATOR WILL RUN AT WHATEVER SPEED NECESSARY TO REMAIN BELOW AMBIENT LEVEL |
| EVENT | WHEN PREDETERMINED LARGE LOAD DEVICE IS TURNED ON | WHEN PREDETERMINED LARGE LOAD DEVICE IS TURNED OFF | VARIABLE | • GENERATOR IS TURNED ON RIGHT AWAY RATHER THAN WAITING FOR BATTERY TO REACH LOW SOC.<br>• ENGINE SPEED MAY DEPEND ON WHICH DEVICE(S) TURNED ON.<br>• CONTROLLER MAY DETECT DEVICE STATUS VIA CAN BUS MESSAGES. |
| LOAD DETECTION | WHEN THRESHOLD LOAD DETECTED | WHEN LOAD IS BELOW THRESHOLD | VARIABLE | • GENERATOR IS TURNED ON RIGHT AWAY RATHER THAN WAITING FOR BATTERY TO REACH LOW SOC<br>• ENGINE SPEED MAY DEPEND ON LOAD AMOUNT<br>• CONTROLLER MAY RECEIVE LOAD FROM BATTERY MONITOR OR BASED ON SENSOR OUTPUT. |

FIG. 3

MARINE AC GENERATOR SYSTEM AND METHOD

FIELD

The present disclosure generally relates to marine vessels, and particularly to alternating current (AC) generator systems on marine vessels for powering a house load of the marine vessel.

BACKGROUND

The following U.S. patents are incorporated herein by reference, in entirety:

The disclosure of U.S. Pat. No. 6,273,771 is hereby incorporated herein by reference and discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

The disclosure of U.S. Pat. No. 8,725,329 is hereby incorporated herein by reference and discloses systems and methods for controlling of a hybrid propulsion system for a marine vessel. A control circuit controls an electric motor-generator according to at least two modes, including a first mode wherein the electric motor-generator receives power from a battery and rotates a driveshaft to drive a propulsor and a second mode wherein the electric motor-generator generates power to charge the battery based upon torque from an internal combustion engine. A time criteria and at least one user-desired operational characteristic of at least one of the internal combustion engine, electric motor-generator, and battery are input to the control circuit. Based on the time criteria and user-desired operational characteristic, the control circuit calculates a schedule for at least one of charging the battery with the electric motor-generator and discharging the battery to a house load of the marine vessel. The control circuit further controls operation of the electric motor-generator according to the schedule.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a marine AC generator system includes a marine generator driven by an internal combustion engine and configured to generate an AC current and a rectifier configured to rectify the AC current to provide a DC current. At least one battery is configured to receive and be charged by the DC current. A battery powered inverter is configured to be powered by the at least one battery and to generate a variable current output frequency such that an AC electrical power is provided to a load when the marine generator is not running.

One embodiment of a method of operating an AC power generation system on a marine vessel includes providing a marine generator configured to charge at least one battery, the at least one battery powering an inverter configured to provide AC electrical power on the marine vessel. Operation of the marine generator is controlled with a controller to charge the at least one battery based on at least one of a state of charge of the at least one battery, a time of day, a threshold load detection, a load event, and an ambient noise level.

Various other features, objects, and advantages of the invention will be made apparent from the following description taken together with the drawings.

BRIEF DESCRIPTION OF THE DRAWINGS

The present disclosure is described with reference to the following Figures.

FIG. 3 is a chart demonstrating exemplary operation modes and criteria for controlling an AC power generation system on a marine vessel in accordance with the present disclosure.

DETAILED DESCRIPTION

Figure 1:
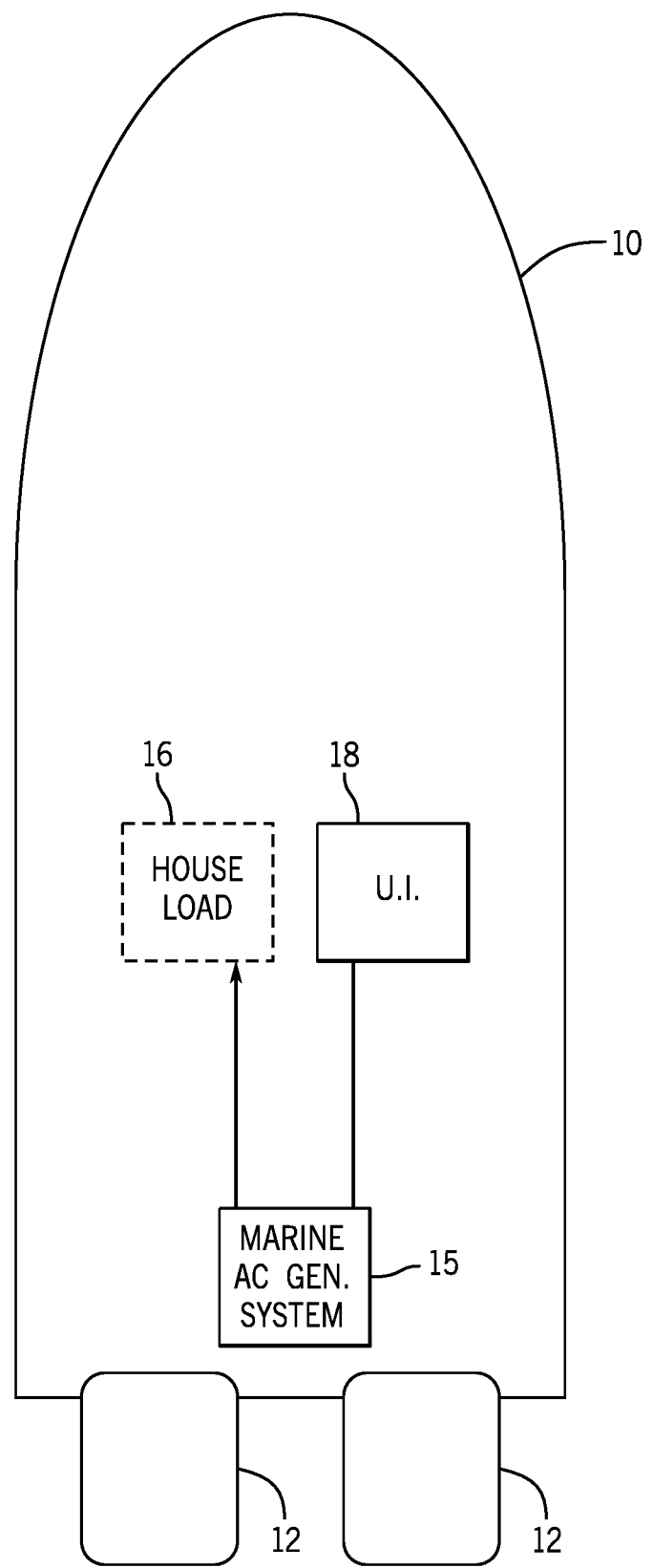
FIG. 1 is a schematic view of an exemplary AC generator system on marine vessel in accordance with the present disclosure.

Marine vessels configured for living aboard and/or housing people overnight or for extended periods, typically have an AC generator system onboard to generate AC power to power devices and systems on the marine vessel. These generator systems provide AC current to power the house load, such as lights, climate control, appliances, entertainment, and other comfort devices, such as gyrostabilizers. These AC power generation systems include internal combustion engines, such as diesel or gasoline engines, for generating the power. The present inventor has recognized problems and challenges with current AC generator systems in that they can be loud and disruptive to passengers on a marine vessel, particularly if they are run at night or at other times of quiet relaxation on the vessel Most marine generators configured to generate alternating current (AC) power on a marine vessel are "fixed speed" generators that run at a constant engine speed. Fixed speed generators provide a direct AC output and must maintain a specified engine revolutions per minute (RPM) to create the specified frequency (typically either 50 hertz or 60 hertz). Thus, the generator must run at its fixed speed regardless of the electrical load, and even very small AC loads will cause the generator to run at the fixed speed. Thus, fixed speed generators are inefficient and must always be running when power is demanded by the load.

Another type of power generation system which has been implemented in marine generators are inverter generator systems. Inverter generators operate much differently than fixed speed generators. Inverter generators provide a direct current (DC) output by rectifying the AC wave form. The DC power is then transferred back into AC power through an inverter. Electronics in the inverter create the desired output frequency, thereby enabling the generator to be run at a variable speed depending on how much power is needed.

The disclosed system and method were developed in view of the problems and challenges in the relevant art recognized by the inventor. The disclosed system and method include an inverter arrangement that decouples the speed of the marine generator from the output frequency, similar to the above-described inverter generator. The disclosed marine AC generation system enables the marine generator to run at lower speeds when less power is demanded or required. Running generators at a lower speed reduces the noise output, and thus is less annoying for people on a vessel.

The disclosed system further provides the ability to store electrical power, which enables provision of AC power to power the house load without simultaneously operating the AC generator. The integrated storage system enables operation of the engine at times that are appropriate and convenient for passengers on a vessel, and further allows the engine to be operated in one or more modes to variously generate power amounts based on constraints relating to comfort optimization for passengers on the marine vessel. For example, the marine generator can be operated to charge the storage device based on at least one of a state of charge of the storage device, a time of day and operation schedule, a threshold load detection, a load event (such as operation of a high load device or system), and/or an ambient noise level. For example, the system can be configured to avoid operation of the internal combustion engine during a scheduled or detected quiet period to avoid disrupting the passenger experience. Similarly, the generator can be operate according to a schedule, where various periods may be set where the generator, if operated, is to be operated in a specified mode, such as a low speed mode, a high speed mode, or an ambient noise-controlled mode where the operation speed of the AC generator is controlled based on a ambient noise level measured on the marine vessel.

FIG. 1 schematically depicts a marine vessel 10 having an on-board marine AC power generation system 15 powering a house load 16. The house load 16 includes devices and systems on the marine vessel 10 not involved in propulsion generation. For example, the house load 16 typically includes appliances, entertainment systems, climate control systems, cabin lights, and the like, and may also include vessel stabilization systems such as a gyrostabilizer.

A user interface 18 may be provided, such as located in the helm area of the vessel 10, that is configured to allow a user to monitor and provide control inputs to the marine AC power generation system 15. The user interface may comprise a digital display and an input device, such as a keyboard, push buttons, a touch screen, etc. In one embodiment, the user interface 18 may comprise part of an on-board management system for the marine vessel 10, such as a VesselView® by Mercury Marine of Fond Du Lac, Wis.

Figure 2:
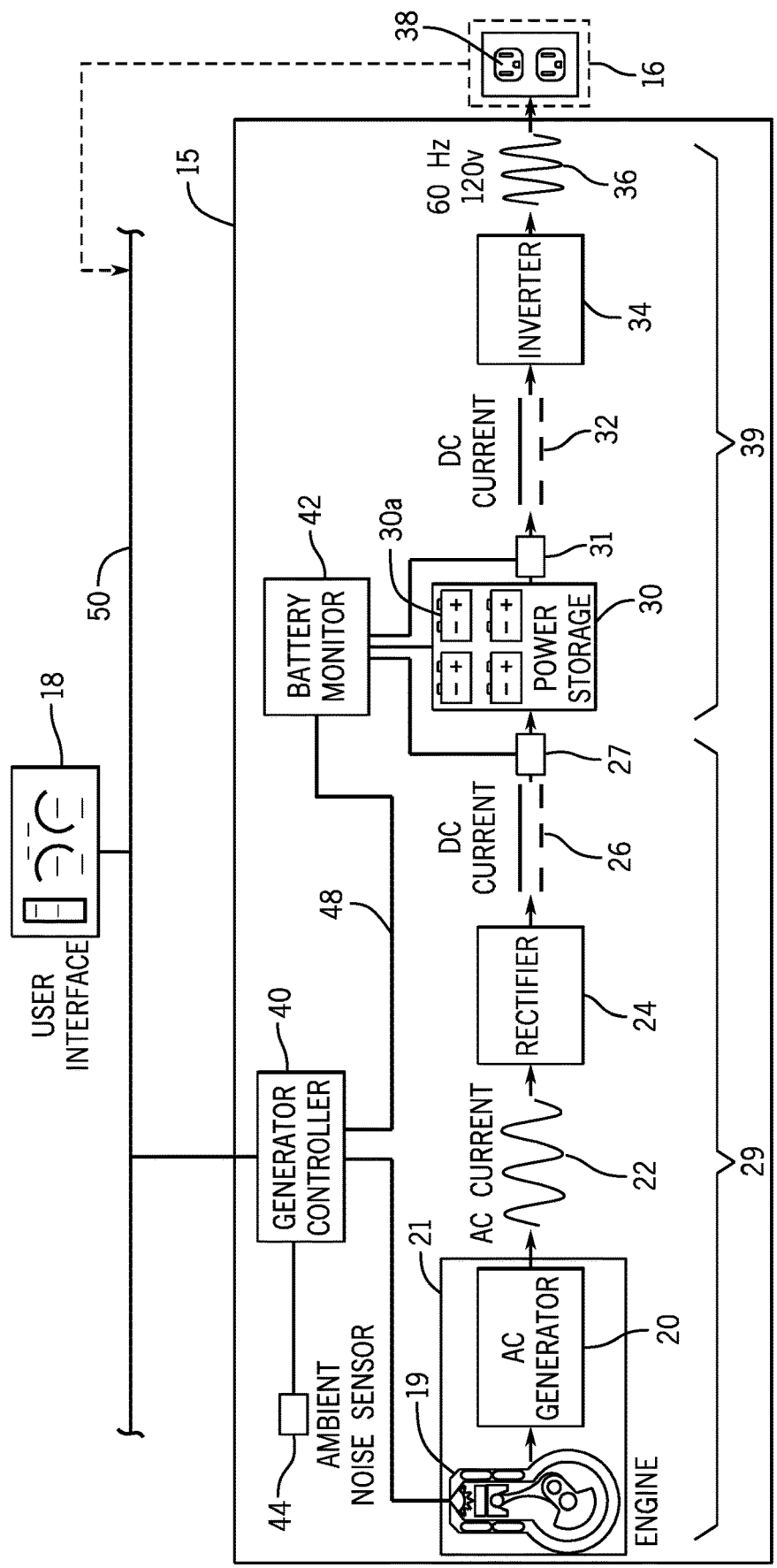
FIG. 2 depicts another embodiment of an AC generator system on a marine vessel in accordance with the present disclosure.

FIG. 2 schematically depicts one embodiment of a marine AC power generation system 15. The system 15 includes a marine generator 21 comprising and AC generator 20 driven by an internal combustion engine 19 and configured to generate an AC current 22. In certain embodiments, the internal combustion engine 19 may be separate from the one or more internal combustion engines comprising the one or more propulsion devices 12 (FIG. 1) on the vessel. In other embodiments, the engine 19 driving the generator 20 may be one or more engines configured as part of a propulsion device 12 for propelling the vessel. The frequency of the AC current 22 is based on the speed of the engine 19. For example, increasing the engine speed of the engine 19 proportionally increases the frequency of the AC current 22.

The AC current is provided to a rectifier 24, which converts the alternating current into a direct current by allowing the current to flow through it in only one direction. The rectifier 24 generates a DC current 26, which is provided to the power storage 30. The power storage 30 includes at least one battery 30a charged by the DC current 26.

Power stored in power storage 30, such as a battery 30a or bank of batteries, is then provided to the various devices and systems comprising the house load 16. Specifically, DC current 32 from the power storage 30 is provided to an inverter 34, which is configured to convert the DC current 32 to an AC current 36 of a specified frequency and voltage. In the depicted embodiment, the AC current 36 is 60 hertz and 120 volts. The AC current 36 is outputted by the AC power generation system 15 and provided to a house load 16. For example, the provided power may be accessible at one or more outlets 38 installed in the marine vessel and is also provided by electrical wiring throughout the marine vessel 10 to various systems and devices thereon.

Thus, in the depicted embodiment, the AC power generation system includes a generator/converter portion 29 and a battery-powered inverter portion 39. This system allows AC electrical devices of the house load to be powered when the generator is not running, improving the comfort aboard the vessel 10. Further, the disclosed system, which separates the generator/converter portion from the load, allows the generator to be run at various engine speeds based on the power generation needs, desired noise level, desired charge speed, and/or other factors relating to comfort and user satisfaction, rather than the AC current demanded by the electrical devices comprising the load 16. This further improves comfort aboard the boat because it allows the generator to be run at times and speeds that are most convenient and provide the best passenger experience.

The power storage 30 comprises one or more batteries 30a. For example, the power storage 30 may be a bank of batteries. The power storage 30 may comprised any type of battery appropriate for placement on a marine vessel, such as a lead acid battery or a lithium ion battery. A battery monitor 42 is provided and configured to determine a battery state of charge (SOC), battery voltage, and/or battery current. One or more sensors may be configured to measure the current, voltage, and/or temperature of power storage 30. In the depicted embodiment, a first sensor 27 is positioned at the input of the power storage 30, and thus is configured to measure the input current, voltage, temperature to the power storage 30. A second sensor 31 is positioned at the output of the power storage, between the one or more batteries 30a and the inverter 34. The second sensor 31 is configured to measure an output current, voltage, and temperature of the power storage 30. The battery monitor 42 utilizes the current, voltage, and temperature data to determine the battery SOC, which is communicated by the battery monitor to the generator controller 40.

The generator controller is configured to control operations of the marine generator 21, and particularly the engine 19, to charge the power storage 30 according to one or more control constraints and/or schedules, examples of which are detailed herein. The controller 40 may be configured to receive user input providing user-specified operation constraints for controlling the period of operation and/or speed of the engine 19. For example, the user interface 18 may be configured to facilitate a user mode selection, where a user selects between one or more control modes specifying how the generator is operated. Thus, the generator controller 40 is configured to control start and stop of the engine 19, as well as throttle positions, engine speed, etc. in order to effectuate the desired charging controls, such as according to a user-set schedule, a user-selected mode, in response to an event such as the start of a large load demanding device, etc.

For example, the system may be configured to operate in a low speed mode where the engine 19 of the marine generator 21 is operated at a low engine speed so as to minimize the noise created, and may also be configured to operate in a high speed mode where the engine is operated at a high engine speed to provide a maximum charge output. In the high speed mode, charge time is minimized and the at least one battery 30*a* of the power storage 30 are charged much more quickly in the high speed mode than in the low speed mode.

The user interface may also be configured to allow a user to set a schedule for operation of the generator system 15. For example, the schedule may set time periods during the day or night that are designated as a quiet period where the generator/converter portion 29 of the system is not operated, or is at least minimally operated. Thus, the user is enabled to set periods of the day where disruption by the noisy generator system is minimized or eliminated. For example, the system may be configured such that the engine 19 is not operated between the hours of 10:00 pm and 8:00 am so that the passengers on the vessel 10 are not disturbed during the night. Further, the generator controller 40 may be configured to control the generator/converter portion 29 to make sure that the power storage 30 is fully charged at the start of a quiet period.

The battery monitor 42 may communicate with the generator controller 40 by various communication means. For example, various devices in the generator system 15 may communicate via a communication link 48, such as a LIN bus or a CAN bus to provide a few examples. In certain embodiments, various house load 16 devices, particularly large power consuming devices may be configured to communicate on one or more of the bus 48 or 50, such as to indicate the start of operation and/or power consumption. Thereby, the generator controller 40 can control the engine 19 accordingly, such as to start the engine when large electrical loads are detected. In other embodiments, the battery monitor 42 and/or one or more house load 16 devices may be configured to communicate directly with the generator controller such as by dedicated wired or wireless communication link. In still other embodiments, the generator controller 40 may be configured to receive the raw sensor and other data directly, and thus the battery monitor 42 may be eliminated.

The generator controller 40 is configured to communicate with the user interface 18 and/or other devices on the vessel 10 via a communication link 50. For example, the communication link 50 may be a CAN bus operating a communication protocol, such as a SmartCraft CAN system by Mercury Marine. In the depicted example, the power generation system 15 has a dedicated communication link 48 that is separate from the communication link 50 for other vessel systems. In other embodiments, the AC power generator system 15 elements may communicate on the same communication link as other vessel systems and thus communication links 48 and 50 may be the same communication system, such as the same CAN bus system.

The controller 40 may be configured to control the marine generator 21, including the engine 19 and AC generator 20, according to one or more modes. FIG. 3 exemplifies various control modes for which the controller 40 may be programmed, which may be user-selectable or effectuated according to a schedule of various mode operations. In the depicted example, three different speed control operations are available, including a low speed mode, a medium speed mode, and a high speed mode. In the low speed mode, the engine 19 is run at a relatively low RPM in order to minimize noise. In the depicted example, the engine 19 is run at a maximum of 2,000 RPM in the low speed mode. By contrast, in the high speed mode the engine 19 is operated at a high engine speed so as to charge the battery as quickly as possible, and thus to minimize charge time. In the high speed mode of the depicted example, the engine 19 is operated at 3500 RPM. In certain embodiments, one or more additional speed modes may be provided, such as medium speed mode as shown in the example where the allowable generator speed is between the low speed and high speed requirements (e.g., 2500 RPM as shown in the example).

Each speed-based mode may further have particular state of charge (SOC) thresholds where the generator is turned on or turned off. Such thresholds may be defined in order to provide a sufficiently charged battery and optimized run time of the engine 19 based on the goal of the mode. For example, in the low speed mode the turn on charge threshold is lower than the turn on SOC threshold for the high speed mode. In the depicted example, the low speed mode has a turn on threshold of 70% SOC and a turn off threshold of 75% SOC. Thus, in the low speed mode the engine 19 will be run minimally and at low speed in order to keep sufficient available charge at the power storage 30. In the high speed mode the turn on and turn off thresholds are higher, and the engine 19 is operated at high speed in order to frequently top off the battery and keep it at full charge. In the example, the turn on threshold is 95% SOC and the turn off threshold is 100% SOC. Thus, the one or more batteries 30*a* is maintained at or near full charge in the high speed mode. In the medium speed mode, the turn off and turn on thresholds are between that of the low speed mode and the high speed mode. In the particular example, the turn on threshold for the medium speed is 80% SOC and the turn off threshold is 85% SOC. In certain embodiments, an additional mode may be provided that is a high efficiency mode where the engine 19 is run at the most fuel efficient speed and the turn off and turn off thresholds are set at values to maximize charging efficiency.

In certain embodiments, the controller 40 may be configured for a state of charge mode where the engine 19 of the marine generator 21 is turned on and off based on the SOC of the power storage 30 and the engine 19 is run at a variable speed based on demand. For example, the engine 19 may be run at whatever speed is necessary to match the current power demand of the house load 16 plus some percentage, such as 10%, over the demand match speed. Thereby, the charge level of the power storage 30 should increase while running in a state of charge mode regardless of the power being consumed by the load 16, assuming that the marine generator is capable of producing sufficient charge.

In another embodiment, the controller 40 operates in an ambient noise mode where the marine generator 21 is controlled based on an ambient noise level on the vessel. The system 15 may include an ambient noise sensor 44 (FIG. 2) configured to measure an ambient noise level on the marine vessel and provide the ambient noise level measurement to the generator controller 40, such as a microphone and processor configured to process the recorded noise to determine a ambient decibel level. The generator controller may then be configured to operate the engine 19 based on the measured ambient noise. For example, the controller 40 may be configured to operate the marine generator 21 in a predetermined mode in order to recharge the power storage 30 when the ambient noise level on the marine vessel is already high. Thereby, the noise created by the generator system will not be as noticeable or disruptive. For example, the controller 40 may be configured to operate the engine 19 in a high speed mode in order to charge the one or more batteries 30a in the power storage 30 when the noise level on the marine vessel is greater than a predetermined loud threshold level. For instance, the loud threshold could be 60 decibels. Alternatively or additionally, the controller 40 may be configured to avoid operating the engine 19 and/or to minimize noise by the marine generator 21 during quiet periods on the marine vessel when the ambient noise vessel is below a quiet threshold. Thus, the controller 40 may be configured to avoid operating the generator such as to reduce the turn on and turn off SOC thresholds and/or to operate the generator in the low speed mode to charge the power storage 30 when the ambient noise level is less than a quiet threshold. For instance, an exemplary quiet threshold could be 40 decibels.

In still another embodiment, the generator controller 40 may be configured to control the marine generator 21 in an event mode where the engine 19 is turned on when one of a predetermined set of large load devices is activated. For example, the controller 40 may be configured to receive a message, such as via communication link 50, indicating when a device requiring significant power is activated, such as one of a predetermined set of devices on the marine vessel. Thus, in certain embodiments, one or more large load devices of the house load 16 may be configured to communicate a message to be received by the generator controller 40 to indicate that the device has or will begin operating and thus demanding power. For instance, the predetermined set of large load devices may include things like large appliances, an air conditioner, and/or a gyrostabilizer device. In such an embodiment, the engine 19 is turned on when one of the predetermined large load devices is turned on so that the power storage 30 can be charged right away rather than waiting for the turn on SOC to occur. In certain embodiments, the marine generator 21 may be turned off when the predetermined large load device is turned off. As described above, the controller 40 may receive a message, such as via one or more of the communication links 48, 50 indicating the operation status of the large load device, such as when the predetermined large load device turns on and when it turns off. The controller 40 may then operate the marine generator 21 accordingly.

The controller 40 may control the engine 19 to operate at a variable speed, such as depending on which predetermined large load device is turned on and how much energy that large load device requires. For example, the controller 40 may store a predefined engine speed associated with each predetermined large load device in the set of large load devices for which it is configured to turn on the marine generator 21. Alternatively or additionally, the controller may store an engine speed in association with combinations of large load devices so as to define a generator output when certain sets, or combinations, of large load devices are operating.

The generator controller 40 may be configured to operate in a load detection mode where the marine generator 21 is turned on when a threshold load is detected in order to charge the power storage 30 right away rather than waiting for the battery to reach a low SOC. The engine 19 may be operated at a variable speed based on the load, where the engine is operated at a higher speed for loads significantly above the threshold and at a lower speed for loads at or near the threshold. In one embodiment, the controller 40 may receive the load value from the battery monitor 42. In one embodiment, the battery monitor 42 may be configured to determine a load amount based on current measured by the first sensor 31 and the second sensor 31, and more particularly as a difference between the current input to the power storage 30 measured by the first sensor 27 and the current output from power storage 30 measured by the second sensor 31. He controller 40 may then receive the load amount from the battery monitor 42 and operate the marine generator 21 accordingly. In other embodiments, the controller 40 may receive measurements from at least the second sensor 31 and may determine the load amount based on the received values.

In various embodiments, the differing operation modes may be controlled based on user input selecting a particular mode or based on a schedule, which may be a user-set schedule. If operating according to a schedule, then the controller 40 will control the marine generator 21 according to the current time of day and the schedule. For example, the schedule may include a quiet period where operation of the generator is avoided or a very low SOC turn on threshold is set, such as 20% SOC, or even lower. In certain embodiments, the schedule may include a low noise period where the controller 40 operates the marine generator 21 in the low speed mode described above. Alternatively or additionally, the schedule may include a maximum charge speed period where the controller 40 operates the marine generator 21 in the high speed mode to maintain the power storage 30 at maximum charge and so as to minimize charge time. In still other embodiments, software instructions may be executed to control the marine generator based on logic encompassing one or more of the above-delineated modes.

Figure 4:
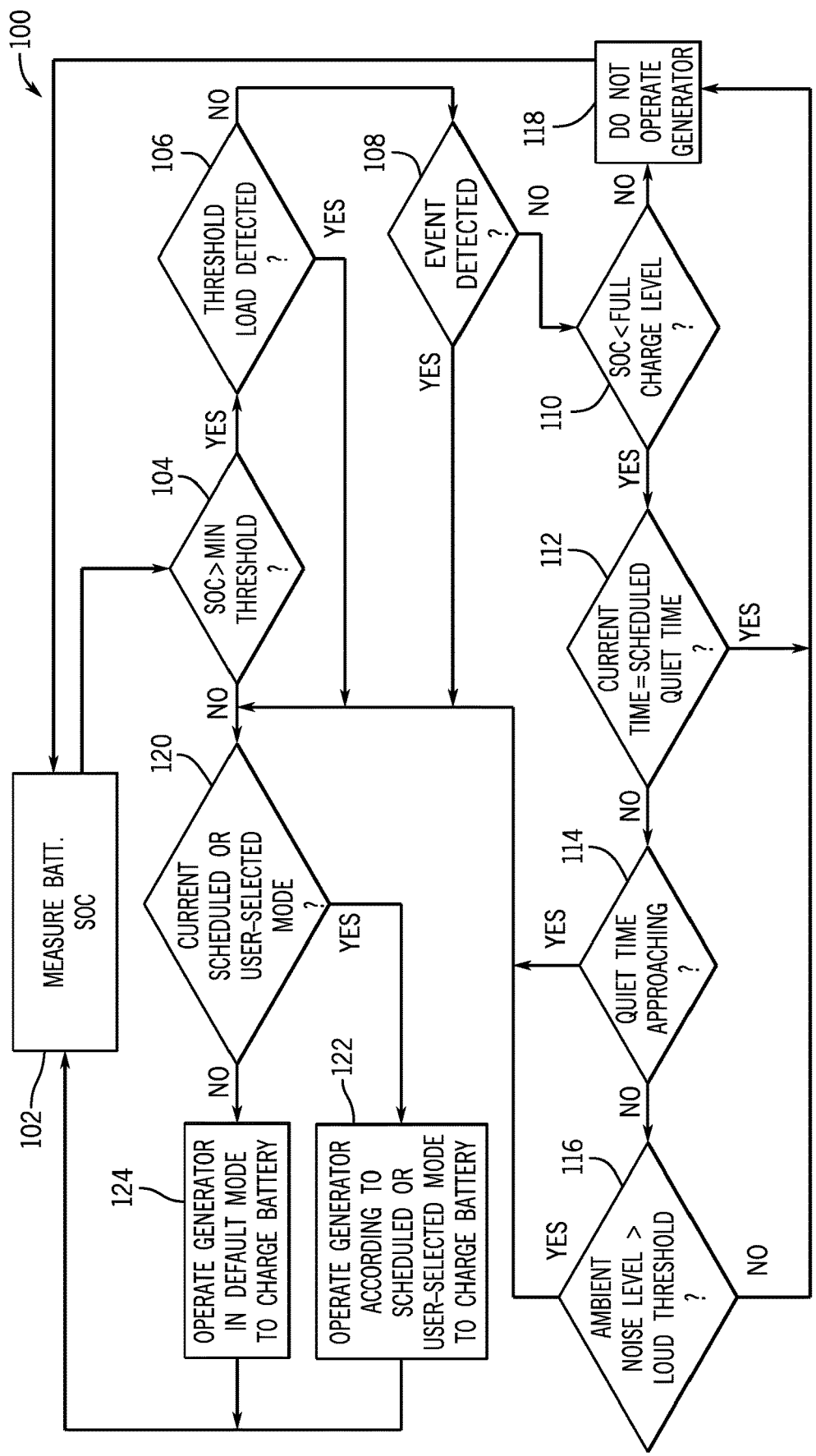
FIG. 4 is a flow chart illustrating an embodiment of a method of operating an AC power generation system on a marine vessel in accordance with the present disclosure.

FIG. 4 depicts one exemplary embodiment of a method 100 of operating an AC power generation system on a marine vessel. A state of charge (SOC) of the power storage 30 including one or more batteries 30a, is measured at step 102. If the state of charge is greater than a minimum threshold determined at step 104, such as a minimum turn on threshold, than further logic is executed to determine whether other conditions exist to turn on the marine generator 21.

In the example at FIG. 4, instructions are executed at step 106 to determine whether a threshold load is detected. Instructions are executed at step 108 to determine whether an event is detected, such as activation of a predetermined large load device. If either the threshold load or the event is detected, then logic is executed to activate the marine generator 21 accordingly. At step 110, logic is executed to determine whether the SOC is less than a full charge level, such as a predetermined turn off threshold. If the power storage 30 is fully charged, then the generator does not need to be operated (represented at step 118). If the power storage 30 is not fully charged, then the controller may be configured to detect whether a quiet time is in effect or is approaching. The generator is turned off if currently operating or otherwise remains off and the controller continues to monitor the battery SOC and control operation of the marine generator accordingly.

As represented at step 112, the controller may determine whether the current time is within a scheduled quiet time and, if so, to not operate the generator. If the scheduled quiet time has not yet occurred but is approaching, then the controller may be configured to operate the marine generator 21 such that the power storage 30 is fully charged at a start of the quiet period. For example, the controller 40 may be configured to control the engine 19 at a sufficient engine speed such that the SOC of the power storage 30 will reach a predetermined threshold, such as 100% SOC, by the start of the quiet period. Alternatively or additionally, the controller 40 may be configured to account for a user selected mode or scheduled mode and to activate the marine generator 21 at an appropriate time based on that mode such that the power storage 30 can reach the full charge threshold by the start of the quiet period. Logic may further be executed to determine whether the ambient noise level is above loud threshold, as represented at step 116. If so, then the controller may activate the marine generator 21, which may be activated according to a selected or scheduled mode or may be activated in a different mode based on the ambient noise level.

In the depicted example, if the SOC is less than or equal to the minimum threshold (such as a turn on threshold), or a threshold load is detected, or an event is detected, or quiet time is approaching, or the ambient noise level is above allowed threshold, then logic is executed to activate the marine generator 21. In the depicted example, the controller determines whether a current scheduled or user-selected mode is in place. If so, then the generator is operated according to step 122 according to the scheduled mode or user-selected mode to charge the at least one battery 30a. If there is not scheduled mode or user-selected mode in place, then the generator is operated in a default mode according to step 121 to charge the battery. For example, the default mode may be a maximum efficiency mode where the engine 19 is operated at the engine speed that is most fuel-efficient. In other embodiments, the default mode may be set based on the threshold or event triggering the activation.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

I claim:

1. A marine AC generator system on a marine vessel, the system comprising:
   a marine generator driven by an internal combustion engine and configured to generate an AC current;
   a rectifier configured to rectify the AC current to produce a DC current;
   at least one battery configured to be charged by the DC current;
   a battery powered inverter configured to be powered by the at least one battery and to generate a variable current output frequency such that AC electrical power is provided to a load when the marine generator is not running;
   a first current sensor configured to sense a current input to the at least one battery and a second current sensor configured to sense a current output from the at least one battery, wherein a load amount is determined based on a difference between the current input and current output;
   a controller configured to control operation of the marine generator to charge the at least one battery based on a comparison of the load amount to a threshold load; and
   wherein the controller is configured to operate the marine generator at a low RPM to charge the at least one battery during a predefined low noise period so as to minimize noise and to operate the marine generator at a high RPM to charge the at least one battery during a predefined maximum charge speed period so as to minimize charge time, wherein the predefined low noise period and the predefined maximum charge speed period are defined based on a preset time schedule and/or a user mode selection; and
   wherein the controller is configured to operate the marine generator to charge the at least one battery based on the user mode selection between at least a low speed mode defining the low noise period where the marine generator is operated at the low RPM to minimize noise and a high speed mode defining the maximum charge speed period where the marine generator is operated at the high RPM so as to minimize charge time.

2. The system of claim 1, wherein the preset time schedule includes a quiet period and the controller is configured to not operate the marine generator during the quiet period.

3. The system of claim 2, wherein the controller is configured to operate the marine generator in advance of the quiet period such that the at least one battery is fully charged at a start of the quiet period.

4. The system of claim 1, wherein the preset time schedule includes at least one of the low noise period and the maximum charge speed period.

5. The system of claim 1, wherein the controller is configured to control operation of the marine generator to start the operation of the marine generator to charge the at least one battery upon detection of the load event indicating that one of a predetermined set of large load devices is running.

6. The system of claim 1, further comprising an ambient noise sensor configured to sense an ambient noise level in the marine vessel, wherein the controller is configured to control the marine generator based on the ambient noise level so as to avoid operating the marine generator and/or to operate the marine generator at the low RPM to charge the at least one battery when the ambient noise level is less than a quiet threshold.

7. The system of claim 6, wherein the controller is configured to start operation of the marine generator to charge the at least one battery when the ambient noise level is greater than a loud threshold.

8. A method of operating an AC power generation system on a marine vessel, the method comprising:
   providing a marine generator configured to charge at least one battery, the at least one battery powering an inverter configured to provide AC electrical power on the marine vessel;
   providing a first current sensor configured to sense a current input to the at least one battery and a second current sensor configured to sense a current output from the at least one battery, wherein a load amount is determined based on a difference between the current input and the current output;
   presenting on a user interface user-selectable inputs to select at least one of a low speed mode and a high speed mode;
   receiving a user input selecting one of the low speed mode and the high speed mode via the user interface;

controlling operation of the marine generator with a controller to charge the at least one battery based on a comparison of the load amount to the threshold load;

wherein controlling operation of the marine generator with a controller includes operating the marine generator at a low RPM to charge the at least one battery during a predefined low noise period so as to minimize noise and to operating the marine generator at a high RPM to charge the at least one battery during a predefined maximum charge speed period so as to minimize charge time, wherein the predefined low noise period and the predefined maximum charge speed period are defined based on a preset time schedule and/or a user mode selection;

based on the low speed mode selection, operating the marine generator at the low RPM so as to minimize noise; and based on the high speed mode selection, operating the marine generator at the high RPM so as to minimize charge time.

9. The method of claim 8, wherein the preset time schedule includes a quiet period during which the marine generator is not operated, and wherein the method further comprises automatically controlling the marine generator to fully charge the at least one battery prior to a start of the quiet period.

10. The method of claim 8, further comprising sensing an ambient noise level on the marine vessel and controlling the marine generator based on the ambient noise level.

11. The method of claim 10, further comprising determining when the ambient noise level is greater than a loud threshold and operating the marine generator to charge the at least one battery when the ambient noise level is greater than the loud threshold.

12. The method of claim 10, further comprising determining when the ambient noise level is less than a quiet threshold and operating the marine generator at the low RPM to charge the at least one battery so as to minimize noise when ambient noise level is less than a quiet threshold.

13. A marine AC generator system on a marine vessel, the system comprising:

a marine generator driven by an internal combustion engine and configured to generate an AC current, wherein the marine generator is configured to operate in a plurality of operation modes each having a different engine RPM at which the engine is operated to charge the at least one battery;

a rectifier configured to rectify the AC current to produce a DC current;

at least one battery configured to be charged by the DC current;

a battery powered inverter configured to be powered by the at least one battery and to generate a variable current output frequency such that AC electrical power is provided to a load when the marine generator is not running;

a first current sensor configured to sense a current input to the at least one battery and a second current sensor configured to sense a current output from the at least one battery, wherein a load amount is determined based on a difference between the current input and current output; and a controller configured to control RPM of the marine generator in the plurality of operation modes and to start operation of the marine generator to charge the at least one battery when a state of charge of the at least one battery is less than a predetermined turn on threshold or based on a comparison of the load amount to a threshold load and to stop operation of the marine generator when the state of charge of the at least one battery reaches a predetermined turn off threshold, wherein the plurality of operation modes are engaged based on a preset time schedule and/or a user mode selection;

wherein the turn on and turn off thresholds are varied based on the operation mode of the marine generator.

14. The system of claim 13, wherein each of the plurality of operation modes have a different turn on threshold and/or turn off threshold assigned thereto.

15. The system of claim 13, wherein the operation modes are controlled based on a preset time schedule.

16. The system of claim 13, wherein the plurality of operation modes includes at least a low speed mode where the marine generator is operated at a low RPM to charge the at least one battery during a predetermined low noise period so as to minimize noise and a high speed mode where the marine generator is operated at a high RPM to charge the at least one battery during a predetermined maximum charge speed period so as to minimize charge time.

* * * * *